A. A. AMONETT.
WHEEL-PLOW.

No. 192,142. Patented June 19, 1877.

UNITED STATES PATENT OFFICE

AMMON A. AMONETT, OF WRIGHTSBOROUGH, TEXAS, ASSIGNOR TO HIMSELF AND JAMES E. WELLS, OF SAME PLACE.

IMPROVEMENT IN WHEEL-PLOWS.

Specification forming part of Letters Patent No. 192,142, dated June 19, 1877; application filed April 23, 1877.

*To all whom it may concern:*

Figure 1:
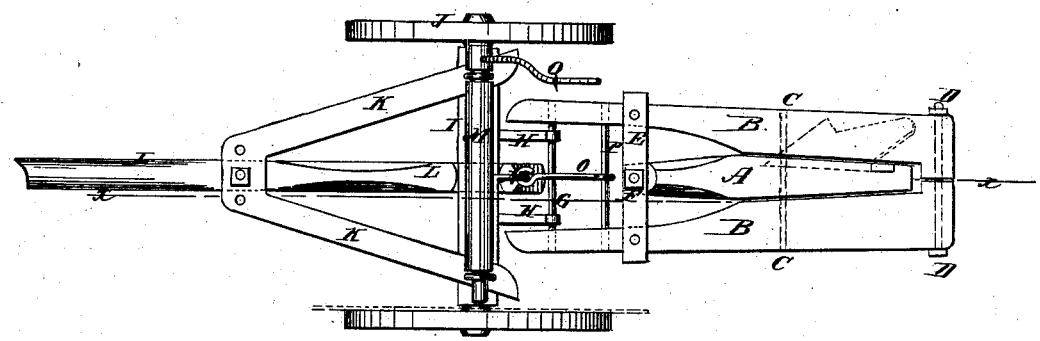
Figure 2:
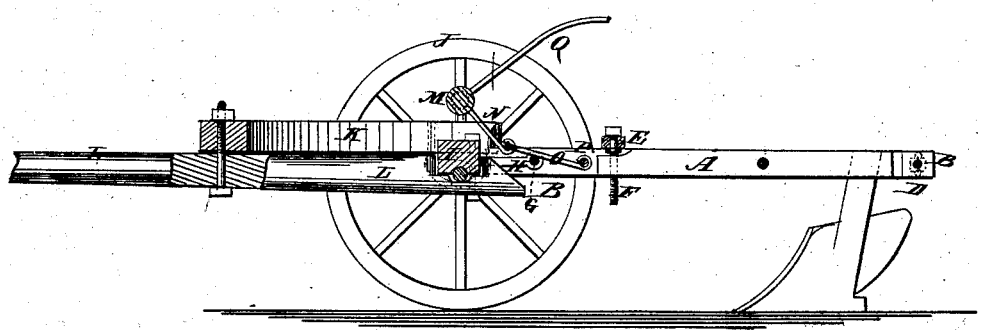

Be it known that I, AMMON ALMARINE AMONETT, of Wrightsborough, in the county of Gonzales and State of Texas, have invented a new and useful Improvement in Wheel-Plow, of which the following is a specification:

Figure 1 is a top view of my improved wheel-plow. Fig. 2 is a vertical longitudinal section of the same, taken through the line $x$ $x$, Fig. 1.

Similar letters of reference indicate corresponding parts.

The object of this invention is to furnish an improved wheel or riding plow, which shall be simple in construction, convenient in use, easily guided and controlled, of light draft, and at the same time strong and durable.

The invention consists in the construction and combination of parts which will be hereinafter more fully explained, and then pointed out in the claim.

A represents the beam of an ordinary plow, which is placed between two bars, B, and is pivoted to them by a bolt, C, a little in front of its standard. The rear ends of the bars B, in the rear of the plow-beam A, are connected together by a bolt, D, several holes being formed in said ends to receive the said bolts D, so that the right-hand bar B may be lowered or raised to cause the plow to run level when one of the wheels is running in a furrow. The forward parts of the bars B are connected by a cross-bar, E, to the center of which is attached a long bolt, F, which passes down through the forward end of the plow-beam A, so that by adjusting the nut of said bolt the forward end of the said plow-beam may be raised or lowered to cause the plow to work deeper or shallower in the ground. To the forward ends of the bars B is attached a cross-rod, G, which passes through the eyes of two eyebolts, H. The eyebolts H are secured to the axle I, which is made about two and a half feet long, and upon its journals revolve the wheels J. To the axle I are attached the hounds K. L is the tongue, which is secured to the center of the axle I by a single bolt, and is also secured to the forward part of the hounds K by a single bolt. Several holes are formed in the forward part of the hounds K to receive the bolt that secures the tongue to them, so that by adjusting the said bolt the carriage may be adjusted to cause the plow to take or leave land, as may be desired.

To the upper side of the axle I is pivoted a roller, M, to which is attached an arm, N, to the end of which is pivoted a connecting-rod, O, the other end of which is pivoted to a cross-rod, P, attached to the bars B in the rear of the rod G. To one end of the roller M is attached a lever, Q, so that by operating the said lever Q the frame B and plow may be raised from the ground, and may be held suspended, for convenience in turning around and in passing from place to place, by passing the end of the lever Q beneath a hook attached to the off hound K.

The trash may be cut by a circular or ring cutter attached to the near wheel J in such a way that its edge may project two inches, more or less, beyond the rim of said wheel, as indicated by dotted lines in Fig. 1.

Having thus described my invention, I claim as new and desire to secure by Letters Patent—

The combination of the bars B and their cross-bar E and bolts C D F, the cross-rod G, and the eyebolts H, with the plow-beam A and the wheels and axle J I, substantially as herein shown and described.

AMMON A. AMONETT.

Witnesses:
S. W. D. PIERPONT,
JOHN A. KING.